United States Patent [19]

Rueckheim

[11] Patent Number: 4,909,874

[45] Date of Patent: Mar. 20, 1990

[54] METHOD AND APPARATUS FOR PRODUCING GAS-CONTAINING INSULATING GLASS ASSEMBLIES

[75] Inventor: Eric W. Rueckheim, Muscoda, Wis.

[73] Assignee: Cardinal IG Company, Minnetonka, Minn.

[21] Appl. No.: 335,683

[22] Filed: Mar. 30, 1989

[51] Int. Cl.[4] ........................ B32B 31/12; B32B 31/20

[52] U.S. Cl. .................................... 156/109; 156/107; 156/286; 156/382

[58] Field of Search ............... 156/104, 107, 109, 286, 156/382; 428/34

[56] References Cited

U.S. PATENT DOCUMENTS

| | | | |
|---|---|---|---|
| 2,756,467 | 7/1956 | Etling . | |
| 3,683,974 | 8/1972 | Stewart et al. | 156/109 X |
| 4,369,084 | 1/1983 | Lisel | 156/382 |
| 4,393,105 | 7/1983 | Kreisman | 428/34 |
| 4,780,164 | 10/1988 | Rueckheim et al. | 156/109 X |
| 4,808,452 | 2/1989 | McShane | 428/34 |

*Primary Examiner*—Robert A. Dawson

*Attorney, Agent, or Firm*—Gregory P. Kaihoi; James R. Haller; Mary P. Bauman

[57] ABSTRACT

A method of producing multi-pane glass units having a non-air gas in the interpane space. The method includes the steps of assembling several glass units, each of which has a pair of spaced glass panes and a peripheral spacer. A separator device is interposed between one of the panes and the peripheral spacer of each of the units. When the units have been so assembled, a vacuum is drawn on the units in an evacuable chamber to remove substantially all of the air from the interpane spaces. The chamber is then refilled with a suitable gas, such as argon, to refill the interpane space of each of the units. The separator is then removed from the glass units, to close the opening between the pane and the peripheral spacer of each unit, thereby completely sealing the interpane space of each unit from the vacuum chamber environment. The units can then be removed from the vacuum chamber and further processed.

12 Claims, 6 Drawing Sheets

Fig. 10
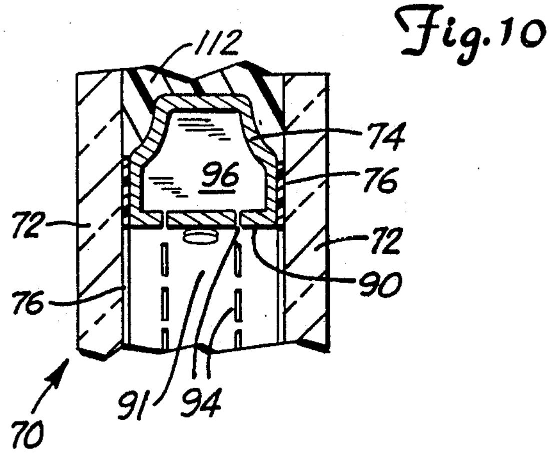
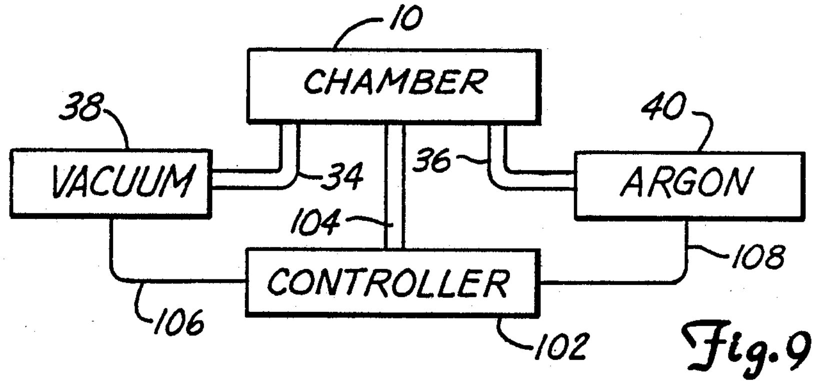
Fig. 9

METHOD AND APPARATUS FOR PRODUCING GAS-CONTAINING INSULATING GLASS ASSEMBLIES

FIELD OF THE INVENTION

The present invention provides quick and commercially economical methods and apparatus for producing multi-pane insulating glass assemblies having interpane spaces filled with a gas having a coefficient of thermal conductivity lower than that of air.

BACKGROUND OF THE INVENTION

Various methods and devices have been proposed for filling the space between panes of insulating glass assemblies with dry or generally inert gases for the purpose of avoiding internal corrosion, condensation and the like, often associated with moist air. U.S. Pat. No. 4,369,084, for example, describes filling of the interpane space of an insulating glass assembly with sulfur hexafluoride, whereas U.S. Pat. No. 3,683,974 employs a fluorocarbon gas for the same purpose. Nitrogen is the gas of choice for this purpose in U.S. Pat. No. 2,756,467, and U.S. Pat. No. 4,393,105 discloses the use of a low heat-transfer gas such as argon.

Prior art methods for replacing air with another gas in an insulating glass assembly are cumbersome and time consuming. In the above-mentioned U.S. Pat. No. 2,756,467, rubbery peripheral spacers are employed between pairs of glass panes, and hypodermic needles are forced through the spacers to withdraw air from the interpane spaces and to deliver nitrogen to the spaces. In U.S. Pat. No. 4,369,084, $SF_6$, a heavy gas, is caused to enter the space between panes at the bottom of a glass assembly and to gradually fill the assembly from its bottom, thus displacing air. In U.S. Pat. No. 3,683,974, sealed, multi-pane glass assemblies are provided with holes through the glass panes through which a fluorocarbon gas is injected, air again being displaced from the interiors of the assemblies. In U.S. Pat. No. 4,393,105, a vacuum can either be drawn on individual multi-pane glass assemblies or the units can be assembled in an environment of vacuum or low heat-loss gas. In U.S. Pat. No. 4,780,164 a vacuum is drawn on a stack of multi-pane glass assemblies having holes in the spacers to permit air to escape and subsequently the desired gas to re-enter; the holes are then plugged.

Modern insulating glass assemblies may employ extruded metal spacers that may be generally rectangular in cross section and that have hollow interiors. The spacers are bonded to confronting glass pane surfaces by means of adherent strips of a polymeric material such as polyisobutylene, and the spacers often have a plurality of small slots or holes in their walls that face the interpane spaces. Desiccants, such as calcium sulfate, may be placed within the hollow spacers for the purpose of absorbing moisture from the gas within the interpane space, the slots in the spacer wall permitting some diffusion of gas across the wall.

When hollow spacers of the type described above are employed, the use of the various methods of the prior art to replace air in the interpane space with argon or the other gas generally does not provide good results since air that is present within the hollow spacer interiors commonly is not fully exchanged.

Moreover, the use of vacuum systems to draw air from an interpane space and the introduction of a different gas into the interpane space causes pressural forces to be exerted on the panes and spacer which can result in pane damage or spacer failures. Even small pressure differentials across a pane, acting on the large pane surface, can give rise to substantial pneumatic forces resulting in substantial bowing of the panes. Such methods therefore must proceed at a controlled pace, limited by the speed at which gases enter and exit the interpane space.

SUMMARY OF THE INVENTION

The present invention provides a method for quickly and economically fabricating a plurality of gas-containing insulating glass units without damage to panes or spacers. In its broader aspect, the invention relates to a method in which a plurality of glass units are formed into a self-supporting assembly, each unit comprisingat least a pair of aligned, parallel, spaced glass panes having a peripheral spacer and confronting surfaces defining with the spacer an interpane space. The units are assembled with separator means for spacing at least a portion of one of thepanes of each unit from the other pane and from the peripheral spacer to provide an opening therebetween, each glass unit being generally in surface-to-surface supporting relationship with an adjacent glass unit. The generally vertical assemblies are either assembled in or moved as a unit into a chamber which is then evacuated to draw substantially all of the air from the interpane spaces. A gas having a coefficient of thermal conductivity ("$K_c$") lower than that of air is then introduced into the chamber, the gas refilling and occupying the interpane spaces. The separator means is then disabled, allowing the panes to relax against the spacers, closing the opening and thereby completely sealing the interpane spaces of the glass units from the vacuum chamber environment. If desired, the assembly of units may be gently compressed to assure a tight seal of the panes against the spacers. Such compression may be accomplished mechanically, as by a pneumatic cylinder, or by raising the pressure in the chamber after the separator means has been disabled. The units are then removed from the chamber for further processing.

In a preferred embodiment, a conveyor is provided for conveying a stack of glass units into and out of the vacuum chamber, the conveyor having a generally horizontal portion for supporting edges of the glass units and a generally vertical portion normal to the generally horizontal portion for supporting a generally vertical portion of the stack. The conveyor extends along a path through aligned front and rear door of the chamber, and includes a first section outside the front chamber door and upon which may be provided a stack of glass units, a second section within the chamber, and a third section beyond the rear door of the chamber to provide a work station for sealing the openings of the units.

Preferably, when the evacuation step has been completed, the stack of glass units is maintained at a pressure of about 10 torr or less for a period of about fifteen seconds or less to insure that substantially all of the air within the glass units has been removed.

DESCRIPTION OF THE DRAWING

FIG. 9 is a schematic representation of one means of operation of the invention;

FIG. 10 is a broken away, cross-sectional view of the edge of a completed glass unit in accordance with the invention.

DESCRIPTION OF THE PREFERRED EMBODIMENT

Figure 1:
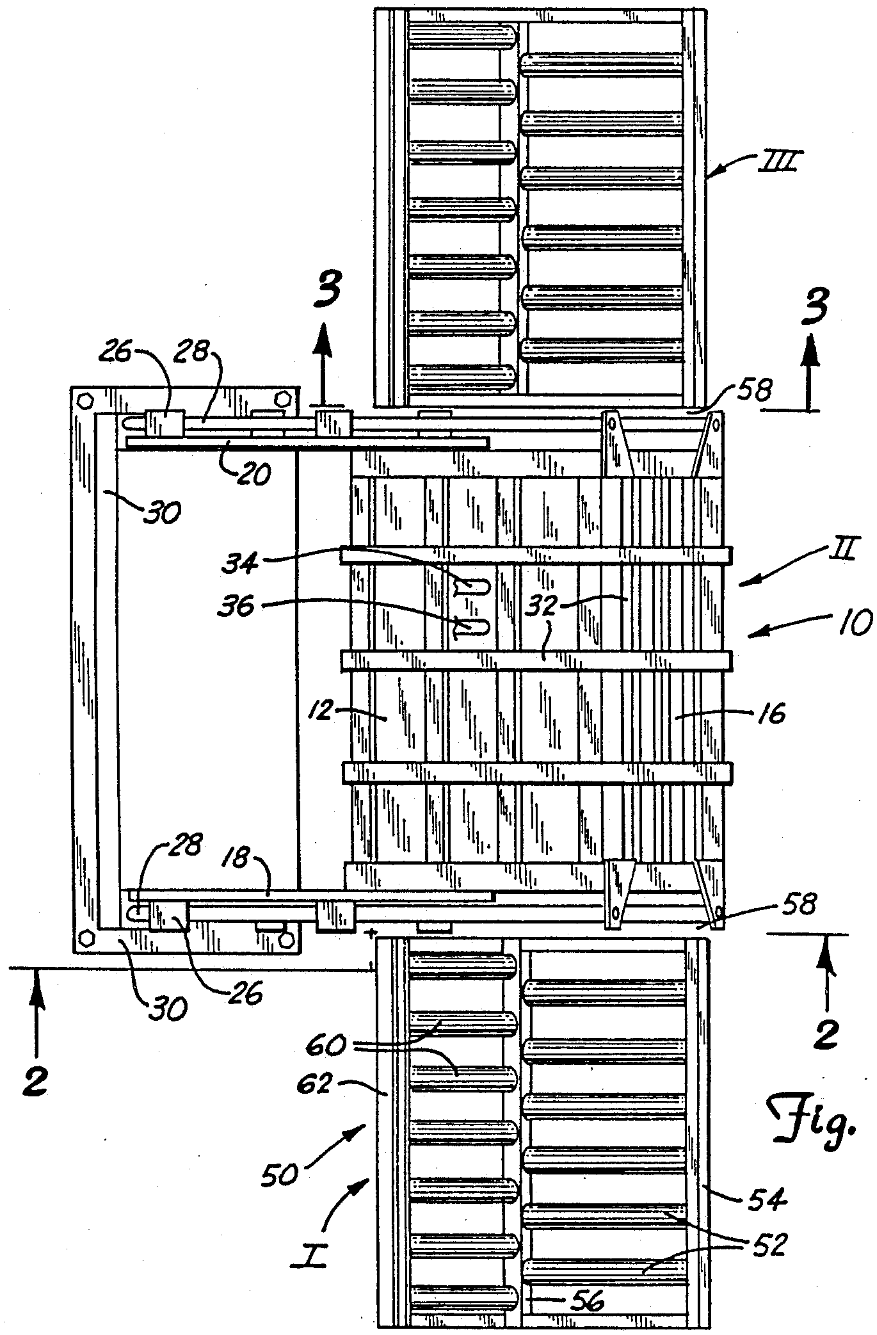
FIG. 1 is a plan view of an apparatus according to the invention.
Figure 2:
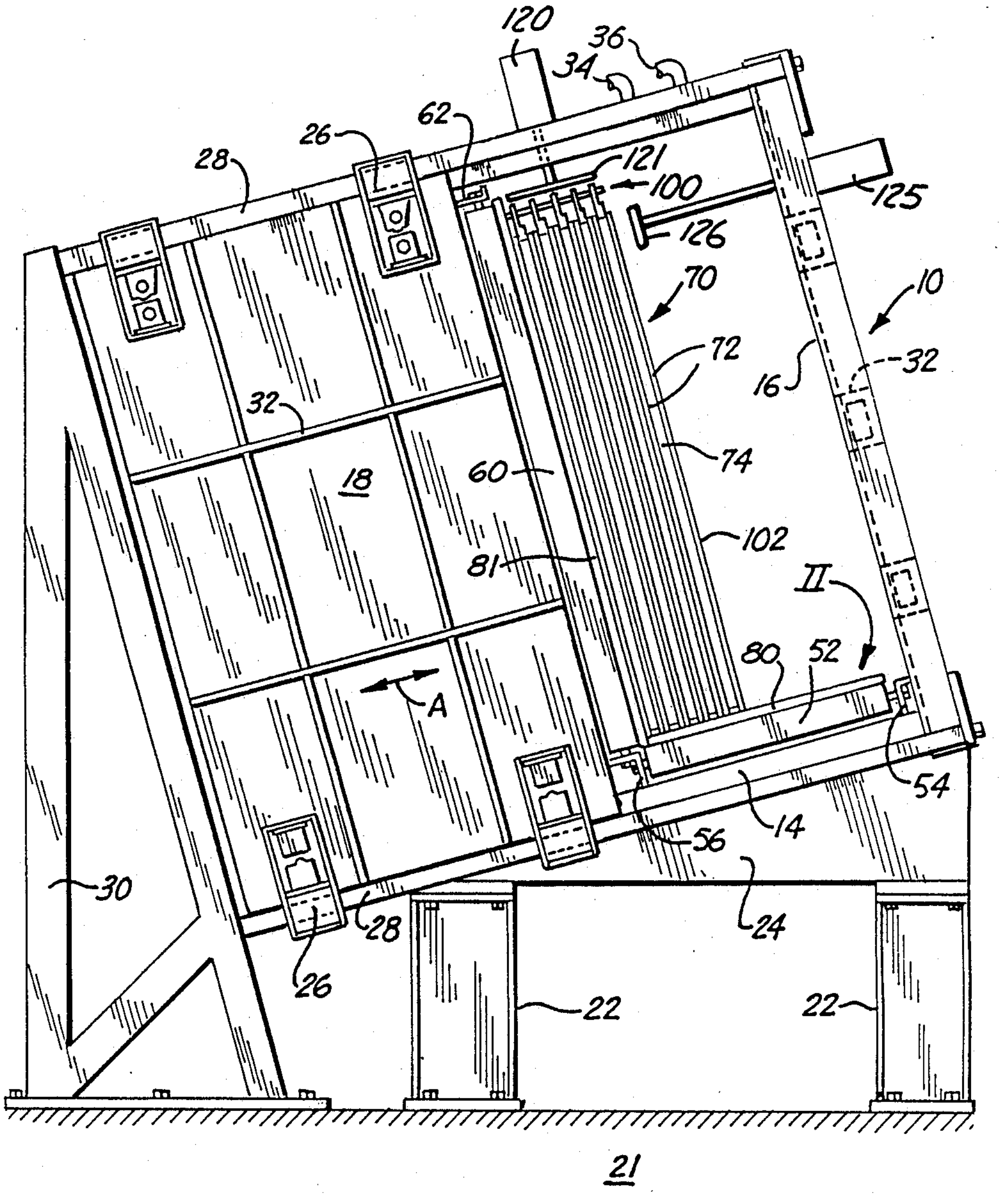
FIG. 2 is a view taken along Line 2—2 of FIG. 1.

With reference to FIGS. 1 and 2, a vacuum chamber is designated generally as 10, the vacuum chamber being generally box-shaped and having top and bottom walls 12, 14 and side walls of which one is shown at 16. The chamber 10 is provided with front and rear sliding doors 18, 20, the doors being shown in their open position in FIGS. 1 and 2 and movable in the direction of arrow "A" (FIG. 2). The vacuum chamber is mounted above the floor (shown at 21) by means of a supporting framework designated generally as 22, the framework including a tilted upper portion 24 supporting the chamber in a tilted position as shown best in FIG. 2. The doors 18, 20 are supported by means of mounting blocks 26 slidable along parallel rails 28 at either end of the vacuum chamber 10, the rails serving to guide the doors 18, 20 between open positions shown in FIGS. 1 and 2 and closed positions in which the door seal the open ends of the vacuum chamber. The rails 28 each are supported at one end by the side wall 16 of the vacuum chamber and at the other end by a floor-mounted side frame designated 30 in FIGS. 1 and 2. The doors and enclosing walls of the vacuum chamber are provided with stiffening ribs depicted generally at 32. Lines 34 and 36 connect the chamber to a source of vacuum (shown schematically at 38 in FIG. 9) and to a source 40 of a low $K_c$ gas such as argon. The source of vacuum 38 may be a simple reciprocating vacuum pump, and the source of low $K_c$ as may be a tank of the gas as is commercially available.

Means is provided within the vacuum chamber to disengage the cams 113 from the panes, as described in greater detail below. In a preferred embodiment, such means may comprise a pneumatic cylinder 120, which may be mounted in part exteriorly of the chamber (FIG. 2). The pneumatic cylinder in turn is connected to an engagement bar 121 oriented within the chamber to engage the rear portion 115 of cams 113 for removing the separating arms 114 of the cams 113 from their separating positions between the glass panes. Other mechanical or electro-mechanical apparatus may alternatively utilized to accomplish the function of so manipulating the cams. A second pneumatic cylinder 125, or equivalent means, may similarly be positioned on the vacuum chamber for use in compressing the stack of glass units after the separating arms 114 of the cams 113 have been removed from their separating positions, as described in greater detail below.

Figure 3:
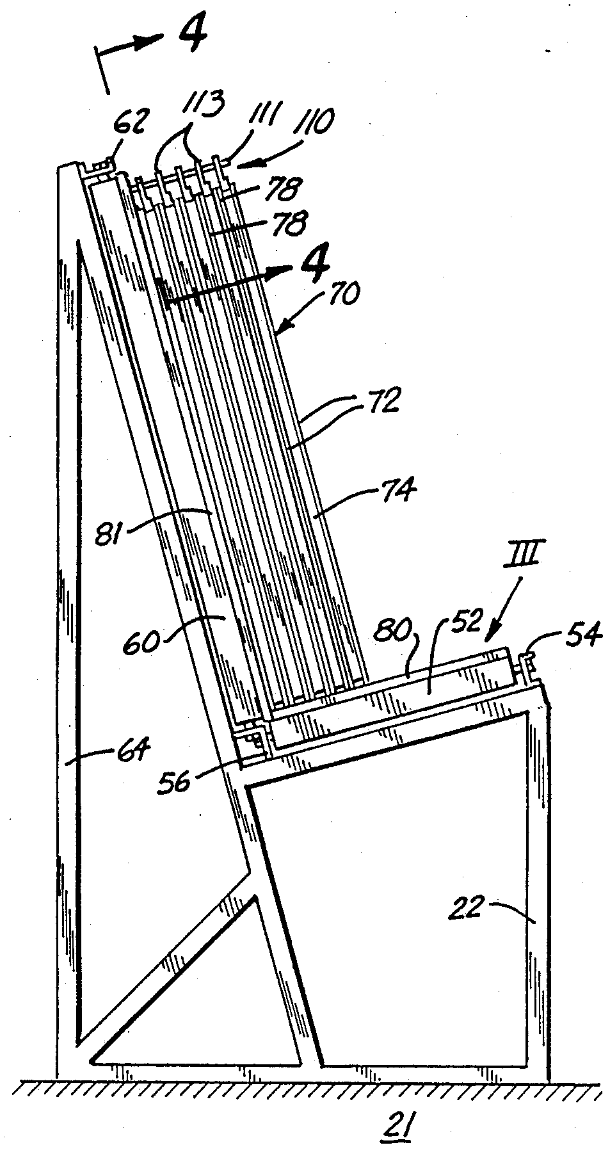
FIG. 3 is a view taken along Line 3—3 of FIG. 1.

Referring to FIGS. 1-3, a conveyor is shown generally at 50. The conveyor typified in the drawing comprises a series of generally horizontally extending rollers 52 having ends journaled into angle iron supports 54, 56, the angle iron supports having a first section extending up to the doorway of the vacuum chamber, a second section within the vacuum chamber, and a third section, shown in FIGS. 1 and 3, extending outwardly of the vacuum chamber on the other side of door 20. The three sections are aligned in a straight path. The gaps 58 (FIG. 1) in the angle iron supports between adjacent sections provide room for the doors 18, 20 to slide into their closed positions between adjacent rollers 52.

The conveyor also includes a generally vertical series of rollers, designated as 60, which are journaled between the previously identified angle iron frame 56 and upper frame 62, the rollers 60 extending generally at right angles to the rollers 52. As shown best in FIGS. 2 and 3, the rollers 52, 60 are not truly horizontal or vertical, but rather are tilted through an angle, preferably of about 15°, to provide the conveyor with a generally upwardly-open "V" configuration, each set of rollers 52, 60 forming each arm of the "V." The rollers 60 extending along the third portion of the conveyor (beyond the door 20 of the vacuum chamber) are supported as shown in FIG. 3 by a ground-mounted frame 64; a similar frame (not shown) is provided for the first section of conveyor extending outwardly from the door 18 of the vacuum chamber. The angle iron frames supporting the rollers within the chamber 10 are supported by the floor and walls of the chamber. As shown in FIG. 2, the inner side walls 16 of the chamber desirably are tilted to run parallel to the rollers 60.

Figure 6:
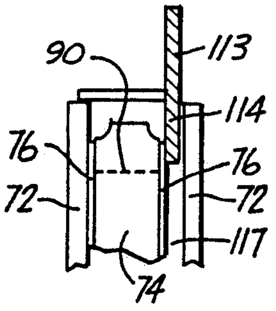
FIG. 6 is a partially broken away, cross-sectional view of FIG. 4 taken along line 6—6 thereof.

Individual multi-pane glass units are shown generally at 70 in FIG. 3, each comprising a pair of generally parallel glass panes 72 and a peripheral spacer 74 at least partially joined to the panes by sealing strips of a polymer such as polyisobutylene, the latter being shown at 76 in FIG. 6. Adjacent units 70 may have their confronting panes in surface-to-surface contact, or, preferably, individual units may be separated by flexible protective sheets 78 of paper or the like. As shown in FIGS. 2 and 3, the individual multi-pane glass units 70 are stacked one against another so that their individual panes 72 are generally parallel and extend generally in vertical planes; that is, the panes 72 extend in planes parallel to the rollers 60. The lower ends of the panes 72 may rest directly upon the rollers 52, or, preferably, may be supported instead upon a rigid sheet such as board 80, the latter rolling upon the rollers 52 and moving with the panes as they travel from Section I to Section III of the conveyor.

The spacer 74, as depicted particularly in FIGS. 6 and 10, is desirably made from aluminum or other convenient metal or plastic by extrusion or by bending or other fabrication techniques. The spacer may be of any convenient cross-sectional configuration, one such configuration being generally C-shaped with the arms of the C extending outwardly parallel to the panes and toward outer edges of the glass panes. The spacer shown in FIGS. 6 and 10, however, is particularly preferred and is generally "D" shaped in cross section, with the flat wall 90 with its central seam 91 facing the interpane space. The spacer may be provided with a series of small slots 94 extending along the length of the spacer and communicating its hollow interior with the interpane space. Granules of calcium sulfate may be placed within the hollow interior of the spacer. The spacer for each glass assembly desirably is formed from a single length of extrusions, being bent at right angles at each of thre corners and having its ends abutting at the fourth corner, where they may be attached, as by mechanical linkages or soldering.

Figure 7:
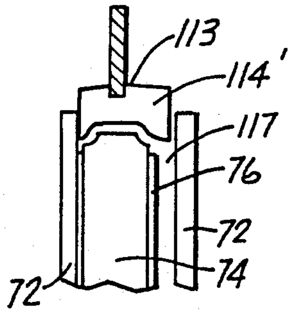
FIG. 7 is an alternative embodiment of the apparatus of FIG. 6.
Figure 8:
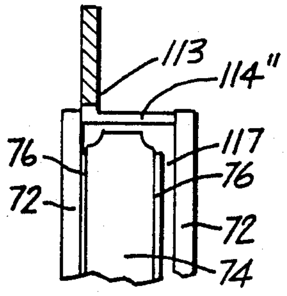
FIG. 8 is another alternative embodiment of the apparatus of FIG. 6.
Figure 5:
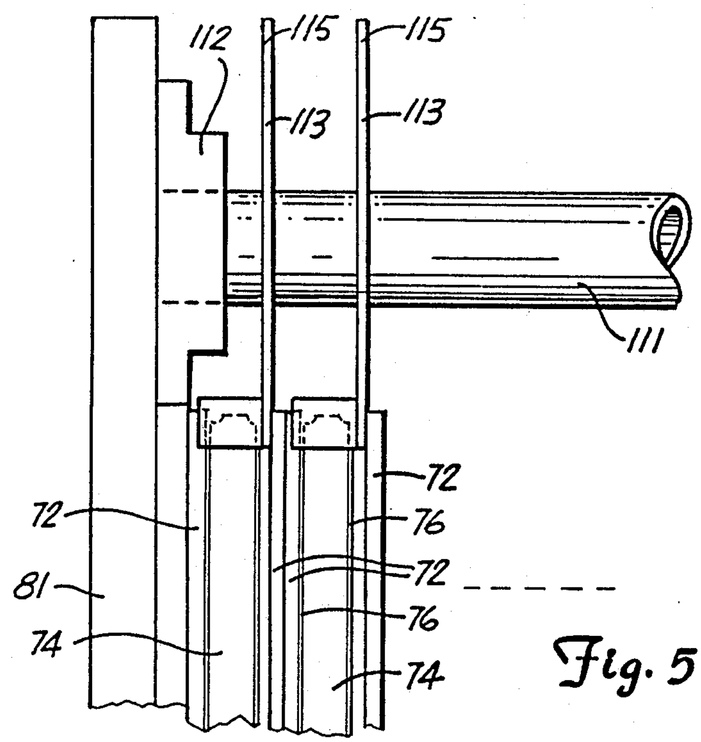
FIG. 5 is a partially broken away, top view of FIG. 3.

A separator assembly 110 (FIG. 5) associated with the stack of glass units includes a support shaft 111 on which are carried a plurality of cams 113 or equivalent separating means. Each cam 113 includes a separating arm 114 configured and arranged to separate a portion of one pane of a glass unit from the spacer 74 and the other pane of the unit, as described below. FIGS. 6–8 depict three alternative embodiments of the separating arm, respectively designated as 114, 114', and 114". When inserted between two panes of a glass unit, desirably the separating arm spaces one of the panes about 1/16 to ⅛ inches from the adjacent spacer 74, providing a sufficiently large opening 117 for air and the low $K_c$ gas to relatively freely exit and enter the interpane space. The opening 117 may be fairly narrow, as its length, which is dependent on both the width of the opening 117 and the size and flexibility of the glass, provides the necessary total area for preventing any substantial pressure differential from developing between the interpane space and the vacuum chamber during evacuation of air and refilling of low $K_c$ gas, at least under all but the severest of operating conditions.

The cams 113 desirably are mounted upon a support shaft 111, which in turn may be mounted to the board 81 against which the stack of glass units rests. In one embodiment, the shaft 111 is detachably mounted to the board 81 by means of a shaft support collar 112. Other suitable means may also be employed. The cams may be rotatably mounted to the shaft 111, or, alternatively, the shaft 111 itself may be rotatably mounted to the board 81. In either case, the cams are mounted so as to permit them to rotate about an axis parallel to the shaft when it is desired to disengage the cams from the panes to allow the panes to completely seal against the spacer 74.

Figure 4:
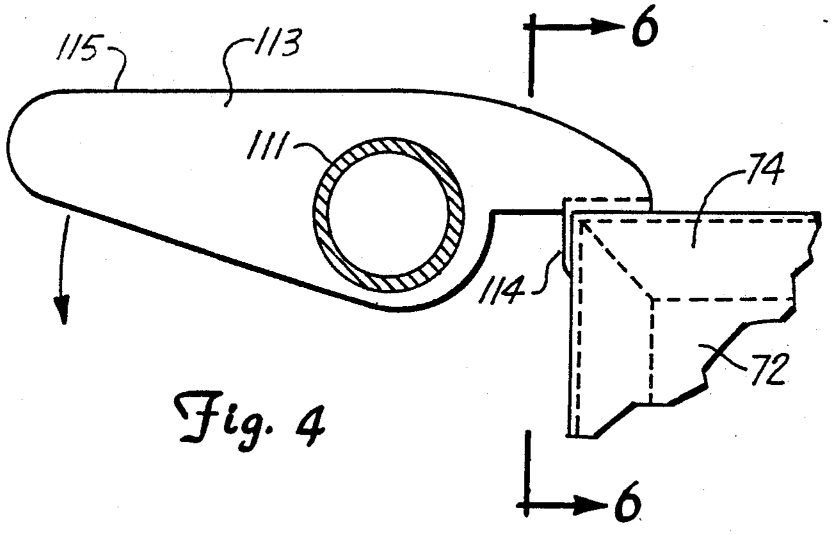
FIG. 4 is a partially broken away, cross-sectional view of FIG. 3 taken along line 4—4 thereof.

Selective rotation of the cams to disengage them from the panes may be accomplished by any suitable means. In a preferred embodiment the cams include a rear bar engaging portion 115 (FIGS. 4–5); when this portion of the cam 113 is depressed, the cam rotates about the shaft 111 axis, disengaging the separating arm 114 of the cam 113 from the panes. Alternately, if the cams are rigidly attached to the shaft 111, the shaft may be rotated by suitable means to disengage the separating arms 114 of the cams 113.

In the method of the invention, glass units as described are stacked as shown in FIGS. 2 and 3 upon the conveyor for subsequent evacuation and refilling with gas. The stack of units initially may be assembled on a horizontal surface and then repositioned upon the conveyor as shown in FIGS. 2 and 3, or may be assembled directly upon Section I of the conveyor. In assembling the stack, glass panes first are suitably prepared, as by washing. A first pane is properly positioned, and then a spacer 74, provided with beads of an adhesive rubber on opposed surfaces, is then laid against the one pane. The separating portion 114 of a cam 113 is suitably positioned adjacent an edge of the glass pane in operative position. A second glass pane then is placed over the spacer, the adhesive rubber beads forming the polymer strips 76 and sealing each glass pane about its periphery to the spacer, except for the portion spaced apart by the cam 113.

Glass units as thus prepared are positioned against one another as shown in FIGS. 2 and 3, interliners such as paper 78 being preferably positioned between adjacent glass units, and lower edges of the glass units resting upon a rigid sheet 80 or other support which rests upon rollers 52. A second flat support, shown at 81 in FIGS. 2 and 3, is positioned against the rollers 60 and has a flat, smooth plane surface against which rests the first paper interliner 78, the support 81 supporting, in surface-to-surface contact through the interlayer, the confronting surface of the first glass assembly. Although only five glass units are shown in FIGS. 2 and 3, the vacuum chamber and conveyor desirably are dimensioned so as to accommodate assemblies of up to 10 to 20 or more glass units at one time.

Once the stack of glass units 70 has been appropriately positioned on the conveyor, including the associated separator assembly 110, it is moved along the conveyor into the vacuum chambers. The doors 18, 20 are closed and sealed, and air is evacuated from the vacuum chamber. As the chamber is evacuated, air escapes from the interpane spaces in each glass unit through the spacers 117 created by the cams 113. In comparison to a single hole in the spacer, such as is shown in U.S. Pat. No. 4,780,164, the spaces 117 created by the cams 113 are sufficiently large that little, if any, pressure differential develops between the chamber environment and the interpane space during evacuation. Thus, the rate at which the chamber is evacuated and refilled need not be as carefully controlled, at least within the broad range of typically attainable rates.

Once a suitably low pressure within the vacuum chamber has been attained (pressures of not greater than about 10 torr are desired, and pressures down to approximately 1 torr and below are preferred), the chamber desirably is maintained at such low pressure for a brief period (e.g., up to about fifteen seconds) to assure that the hollow interiors of the spacers have been fully evacuated as well. Thereafter, argon or another low $K_c$ gas is introduced to the vacuum chamber. Again, the rate of pressure increase during refilling with the low $K_c$ gas need nott be strictly controlled, as the spaces 117 are sufficiently large to accommodate typically desired rates. It is also desired to permit the low $K_c$ gas to remain in contact with the glass units within the closed vacuum chamber for a period of up to about fifteen seconds to assure that the gas pressure within the hollow spacers has come into equilibrium with the interpane pressures.

If desired, a pressure monitor and controller may be included. Such a system would, in simple form, compare the measured pressure in the vacuum chamber with a preprogrammed desired pressure and a danger limit pressure, providing an error signal to the vacuum pump or gas valve to regulate pressure as desired. Pressure regulating controllers are well-known, and a suitable controller is shown schematically at 102 in FIG. 9. A chamber pressure signal may be supplied to the controller through Line 104 which, in turn, provides appropriate signals through leads 106, 108 to the vacuum pump and to the supply of gas 40.

When the chamber is at the desired pressure with the low $K_c$ gas the pneumatic cylinder 120 is actuated to pivot the cams 113 out of engagement with the glass panes. As the panes are tilted slightly from vertical on the conveyor, removal of the cams permits them to relax into sealing engagement with the bead of adhesive, completing the sealing and compression of the adhesive into the polymer strips 76. Desirably a gentle compression force is applied to the assembly of units to assure complete compression of the adhesive bead and formation of the seal. In one embodiment, such compression is supplied by pneumatic cylinder 125, which presses with a suitable pad 126 against the outer-most glass unit. Alternatively, additional low $K_c$ gas may be supplied to the vacuum chamber to a final pressure slightly higher than the pessure in the now sealed inter-pane space, thereby exerting a suitable compression force against the outer-most glass unit.

Because sealing of the glass units is accomplished in the vacuum chamber, the exact final pressure of low $K_c$ gas in the units will be uniform and may be accurately controlled, particularly in comparison to prior methods involving sealing a hole in the spacer of each unit after remioval of the units from the vacuum chamber. Once the glass units have been sealed in the vacuum chamber, the door 28 is opened and the glass units 70 are removed along the conveyor onto Section III thereof. A sealant such as vulcanizable silicone rubber 118 (FIG. 10) may be inserted within the small spaces between the edges of the glass planes and the outer portion of the spacer 74. The sealant may be applied while the panes are maintained in the generally vertical position shown in FIG. 3, or the panes may be swung through a suitable mechanism (not shown) into a generally horizontal configuration to facilitate application of the sealant.

While a preferred embodiment of the invention has been described, it should be understood that various changes, adaptations and modifications may be made therein without departing from the spirit of the invention and the scope of the appended claims.

I claim:

1. Method of producing multi-pane glass units having a non-air gas in the interpane space comprising the steps of:

(a) assembling a plurality of insulating glass units, each unit comprising at least a pair of generally parallel, aligned glass panes having confronting surfaces, a spacer extending peripherally about the unit between the glass panes and defining, with the glass panes, an interpane space, and including separator means for spacing at least a portion of one of the panes of each unit from the peripheral spacer to provide an opening therebetween;

(b) drawing a vacuum in an evacuable chamber within which the glass units are housed to remove substantially all of the air from the interpane spaces;

(c) refilling the chamber with a gas having a coefficient of thermal conductivity lower than that of air, the gas refilling the interpane spaces of the glass units;

(d) disabling said separator means, while the units are in the chamber, to close said opening and thereby to completely seal the interpane spaces of the glass units from the (e) removing the glass units from the vacuum chamber.

2. The method of claim 1 including the step of gently mechanically compressing the glass units against one another after the separator means has been disabled to assure sealing contact of each spacer with its associated glass panes.

3. The method of claim 1 including the step of slightly pressurizing the chamber after the separator means has been disabled, thereby compressing the glass units against one another to assure sealing contact of each spacer with its associated glass panes.

4. The method of claim 3 wherein the chamber is slightly pressurized with the same gas used to refill the chamber.

5. The method of claim 1 wherein the separator means comprises a plurality of cams respectively associated with the glass units, each cam acting to space an edge of a pane from its associated spacer.

6. The method of claim 5 wherein the disabling step comprises manipulating the cams to disengage them from the panes, allowing the panes to relax into sealing contact with their respective spacers.

7. The method of claim 1 wherein the separator means spaces a portion of one pane at least about 1/16 inches from the spacer.

8. The method of claim 5 wherein the cams are carried by a support shaft and are rotatable with respect to the glass units, and the disabling step comprises rotating the cams a sufficient distance to disengage the cams from the panes.

9. The method of claim 1 wherein the gas is argon.

10. Method of producing multi-pane glass units having a non-air gas in the interpane space comprising the steps of:

(a) assembling a plurality of insulating glass units, each comprising at least a pair of generally parallel, aligned glass panes having confronting surfaces, a spacer extending peripherally about the unit between the glass panes and defining, with the glass panes, an interpane space, and including separator means comprising a plurality of cams respectively associated with the glass units, each cam spacing at least a portion of one of the panes of the unit from the peripheral spacer a distance of at least about 1/16 inches to provide an opening therebetween, each glass unit being generally in surface-to-surface supporting relationship with an admacent glass unit;

(b) drawing a vacuum in an evacuable chamber within which the glass units are housed to remove substantially all of the air from the interpane spaces;

(c) refilling the chamber with a gas having a coefficient of thermal conductive lower than that of air, the gas refilling the interpane spaces of the glass units;

(d) disengaging the cams from the glass units and allowing the panes to relax into sealing contact with their respective spacers, thereby closing the opening and completely sealing the interpane spaces of the glass units from the vacuum chamber environment;

(e) compressing the glass units against one another to assure sealing contact of each spacer with its associated glass panes; and (f) removing the glass units from the vacuum chamber.

11. A method of producing multi-pane glass units having a non-air gas in the interpane space, comprising the steps of:

(a) assembling a plurality of insulating glass units, each unit being assembled by (i) positioning a first pane against a support board or the pane of a previously assembled unit;

(ii) placing a peripheral spacer on a surface of the first pane generally about the periphery thereof;

(iii) positioning a separator adjacent an edge of the first pane; and (iv) placing a second pane against the spacer in a generally aligned relationship to the first pane so that the separator provides an opening between the second pane and the spacer along at least a portion of the spacer, the two panes and the spacer defining an interpane space;

(b) drawing a vacuum in an evacuable chamber within which the glass units are housed to remove substantially all of the air from the interpane spaces;

(c) refilling the chamber with a gas having a coefficient of thermal conductivity lower than that of air, the gas refilling the interpane spaces of the glass units;

(d) removing the separator, while the units are in the chamber, to close the opening and thereby completely seal the interpane spaces of the glass units from the vacuum chamber environment; and (e) removing the glass units from the vacuum chamber.

12. A method of producing multi-pane glass units having a non-air gas in the interpane space, comprising the steps of:

(a) assembling a plurality of insulating glass units, each unit being assembled by placing a peripherally extending spacer between a pair of glass panes, the spacer and the panes defining an interpane space;

(b) during the assembly of such units placing a separator in operative position with each unit to separate at least a portion of one of its panes from its spacer to provide an opening therebetween;

(c) drawing a vacuum in an evacuable chamber within which the glass units are housed to remove substantially all of the air from the interpane spaces;

(d) refilling the chamber with a gas having a coefficient of thermal conductivity lower than that of air, the gas refilling the interpane spaces of the glass units;

(e) removing the separators, while the units are in the chamber, to close the opening and thereby completely seal the interpane spaces of the glass units from the vacuum chamber environment; and (f) removing the glass units from the vacuum chamber.

* * * * *